United States Patent
Tzvetkov

(10) Patent No.: US 7,184,040 B1
(45) Date of Patent: Feb. 27, 2007

(54) EARLY STENCIL TEST REJECTION

(75) Inventor: Svetoslav D. Tzvetkov, Irvine, CA (US)

(73) Assignee: Nvidia Corporation, Santa Clara, CA (US)

( * ) Notice: Subject to any disclaimer, the term of this patent is extended or adjusted under 35 U.S.C. 154(b) by 528 days.

(21) Appl. No.: 10/719,109

(22) Filed: Nov. 21, 2003

(51) Int. Cl.
*G06T 15/00* (2006.01)

(52) U.S. Cl. .............. 345/421; 345/419; 345/420; 345/422

(58) Field of Classification Search ........... 345/419, 345/420, 421, 422
See application file for complete search history.

(56) References Cited

U.S. PATENT DOCUMENTS 6,999,076 B2 * 2/2006 Morein ............ 345/422
7,030,878 B2 * 4/2006 Xu et al. .......... 345/422

* cited by examiner

*Primary Examiner*—Phu K. Nguyen
(74) *Attorney, Agent, or Firm*—Patterson & Sheridan, L.L.P.

(57) ABSTRACT

Early stencil rejection is used to improve throughput of a graphics processing pipeline. Early stencil rejection of some fragments may be performed prior to fragment shading using stencil test results based on a predicted stencil function. Early stencil rejection is performed when either the predicted stencil function matches the actual stencil function or the actual stencil function is a subset of the predicted stencil function. Early stencil rejection is performed without additional read accesses of a stencil buffer.

20 Claims, 6 Drawing Sheets

EARLY STENCIL TEST REJECTION

FIELD OF THE INVENTION

One or more aspects of the invention generally relate to computer graphics, and more particularly to stencil testing.

BACKGROUND

Conventional graphics processors are exemplified by systems and methods developed to perform stencil testing following fragment shading. Shaded fragments that fail a stencil test specified by a stencil function are rejected and are not written to a frame buffer. Shading fragments which are not written to the frame buffer is inefficient, because the throughput of a conventional graphics processor may be reduced. Furthermore, memory bandwidth utilization is increased to read texture data, depth, or stencil values to process fragments which are rejected during stencil testing. In conventional graphics processors rendering performance may be limited due to memory bandwidth. In those systems, rendering performance may be improved by reducing the number of memory accesses needed to process fragments which will be rejected during stencil testing. There is thus a need for performing an early stencil test to reject fragments prior to shading.

SUMMARY

The current invention involves new systems and methods for performing early stencil test rejection, thereby improving fragment processing performance.

Various embodiments of a method of the invention include a method for performing early stencil rejection. The method includes comparing a first stencil function used to generate a stencil result to a second stencil function and modifying coverage data when the first stencil function matches the second stencil function to produce modified coverage data.

Various embodiments of a method of the invention include a method for performing early stencil rejection. The method includes producing stencil data using a predicted stencil function and modifying coverage data using the stencil data responsive to a comparison between the predicted stencil function and a stencil function.

Various embodiments of the invention include an early stencil rejection system. The early stencil rejection system includes a storage resource configured to store stencil results and a test unit coupled to the storage resource. The test unit is configured to read a portion of the stencil results and to modify coverage data, producing modified coverage data.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
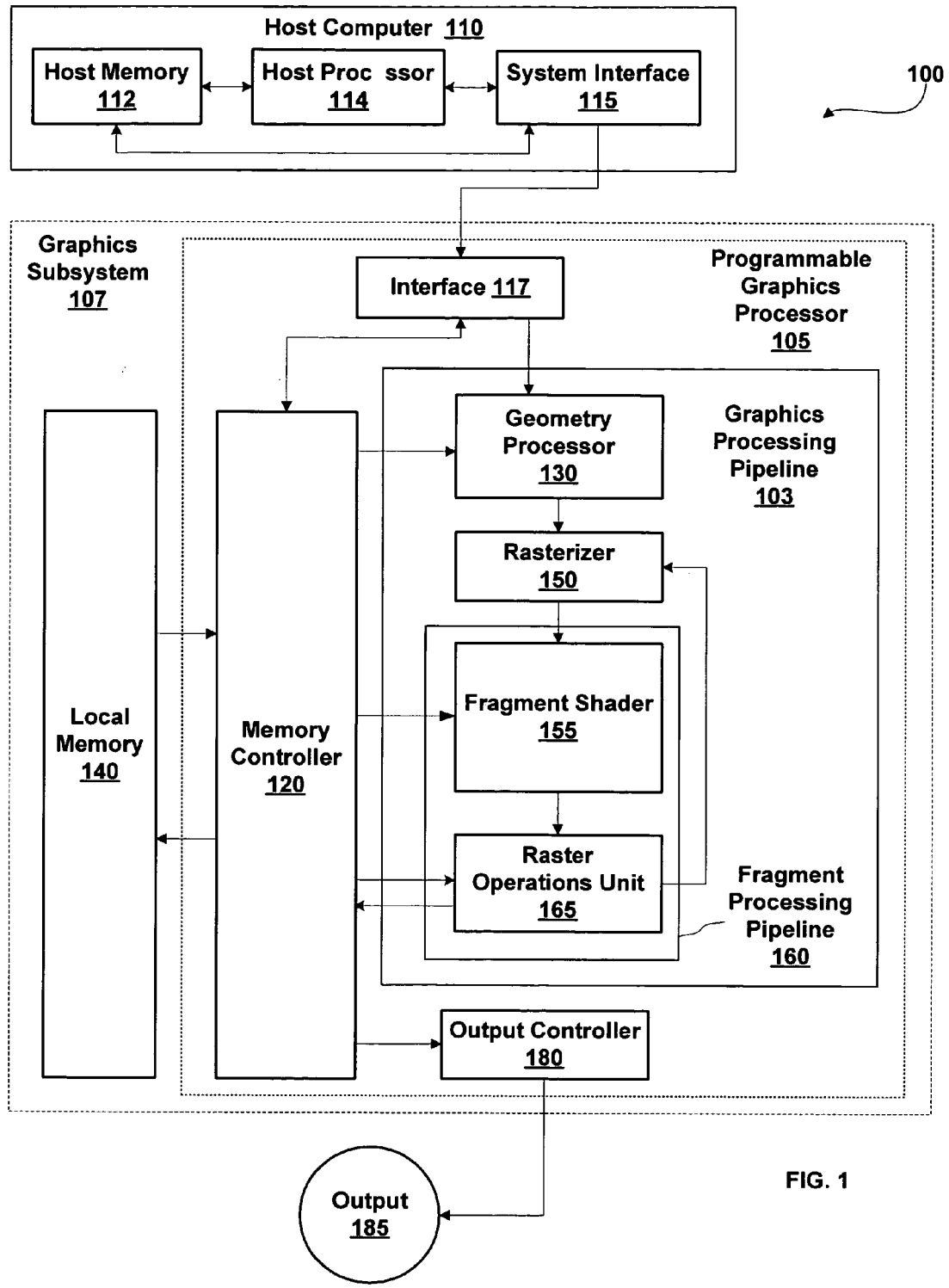
FIG. 1 is a block diagram of an exemplary embodiment of a respective computer system in accordance with one or more aspects of the present invention including a host computer and a graphics subsystem.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data and program instructions, where graphics data is any data that is input to or output from computation units within Programmable Graphics Processor 105. Graphics memory is any memory used to store graphics data or program instructions to be executed by Programmable Graphics Processor 105. Graphics memory can include portions of Host Memory 112, Local Memory 140 directly coupled to Programmable Graphics Processor 105, storage resources coupled to the computation units within Programmable Graphics Processor 105, and the like. Storage resources can include register files, caches, FIFOs (first in first out), and the like.

In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through Memory Controller 120. In addition to communicating with Local Memory 140, and Interface 117, Memory Controller 120 also communicates with Graphics Processing. Pipeline 103 and Output Controller 180 through read and write interfaces in Graphics Processing Pipeline 103 and a read interface in Output Controller 180.

Within Graphics Processing Pipeline 105, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Operations Unit 165.

Vertex programs are sequences of vertex program instructions compiled by Host Processor 114 for execution within Geometry Processor 130. Geometry Processor 130 outputs configuration information, such as a state change effecting processing of the data, to Rasterizer 150. Shader programs are sequences of shader program instructions compiled by Host Processor 114 for execution within Fragment Processing Pipeline 160. Geometry Processor 130 receives a stream of program instructions (vertex program instructions, configuration information, and shader program instructions) and data from Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory, e.g., portions of Host Memory 112, Local Memory 140, or storage resources within Programmable Graphics Processor 105. When a portion of Host Memory 112 is used to store program instructions and data the portion of Host Memory 112 can be uncached so as to increase performance of access by Programmable Graphics Processor 105. Alternatively, the configuration information is written to registers within Geometry Processor 130, Rasterizer 150 and Fragment Processing Pipeline 160 using commands, encoded with the data, or the like.

Data processed by Geometry Processor 130 and state information are passed from Geometry Processor 130 to a Rasterizer 150. Rasterizer 150 is a sampling unit that processes graphics primitives and generates sub-primitive data, such as pixel data or fragment data, including coverage data. Coverage data indicates which sub-pixel sample positions within a pixel are "covered" by a fragment formed by the intersection of the pixel and a primitive. Graphics primitives include geometry, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 receives stencil data from Raster Operations Unit 165 and performs early stencil test rejection to cull some fragments.

Stencil testing may be used to perform a dissolve between two of more frames, decaling, culling fragments that are in shadow, or determining depth complexity. A typical stencil value is represented as an 8-bit integer. Stencil values are read and written to a stencil buffer stored in graphics memory by Raster Operations Unit 165. For some applications generation of the stencil values and their use for culling fragments are performed in separate stages of the rendering. During the writing stage Rasterizer 150 receives stencil data from Raster Operations Unit 165, which can be used later in the testing stage. Because the stencil function used in the testing stage may not be available when the stencil values are being written, the stencil data received by Rasterizer 150 from Raster Operations Unit 165 includes stencil test results generated using a predicted stencil function, as described further herein. When the "actual" stencil function will yield the same result as the predicted stencil function, Rasterizer 150 uses the stencil test results to cull some fragments. Otherwise, Rasterizer 150 does not perform early stencil test rejection and conventional stencil testing is performed in Raster Operations Unit 165. Finally, Rasterizer 150 outputs fragment data and commands to Fragment Processing Pipeline 160.

The commands and shader program instructions (read from graphics memory) configure the Fragment Processing Pipeline 160 to process fragment data by specifying computations and computation precision. Fragment Shader 155 is optionally configured by the shader program instructions such that fragment data processing operations are performed in multiple passes within Fragment Shader 155. Fragment Shader 155 outputs processed fragment data, e.g., color and depth, and configuration information generated from shader program instructions to Raster Operations Unit 165.

Raster Operations Unit 165 includes a read interface and a write interface to Memory Controller 120 through which Raster Operations Unit 165 accesses data stored in Local Memory 140 or Host Memory 112, including stencil values stored in one or more stencil buffers. Raster Operations Unit 165 outputs stencil data to Rasterizer 150 whenever a stencil buffer is read or written, as described further herein in relation to FIG. 2B. Raster Operations Unit 165 optionally performs near and far plane clipping and raster operations, such as stencil testing, z test, blending, and the like, using the sub-pixel fragment data and pixel data stored in Local Memory 140 or Host Memory 112 at a pixel position (image location specified by x,y coordinates) associated with the processed fragment data. The output data from Raster Operations Unit 165 is written back to Local Memory 140 or Host Memory 112 at the pixel position associated with the output data and the results, e.g., image data are stored in graphics memory.

When processing is completed, an Output 185 of Graphics Subsystem 107 is provided using Output Controller 180. Alternatively, Host Processor 114 reads the image stored in Local Memory 140 through Memory Controller 120, Interface 117 and System Interface 115. Output Controller 180 is optionally configured to deliver data to a display device, network, electronic control system, other Computing System 100, other Graphics Subsystem 107, or the like.

Figure 2A:
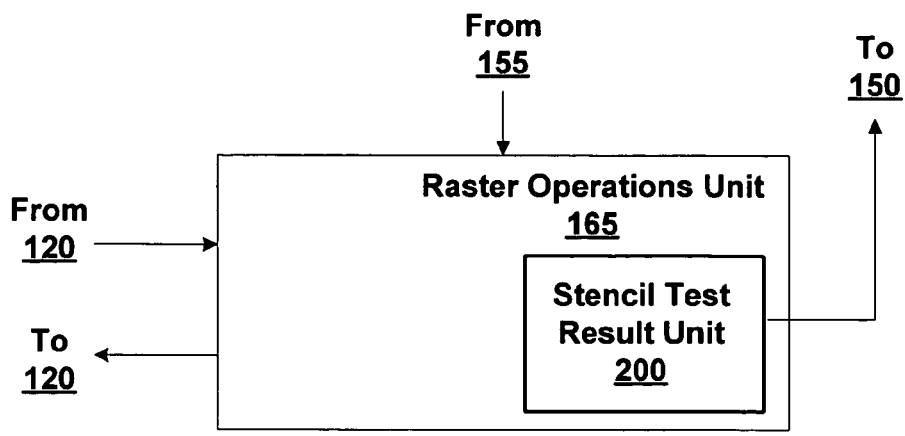
FIG. 2A is a block diagram of an exemplary embodiment of the raster operations unit of FIG. 1 in accordance with one or more aspects of the present invention.

FIG. 2A is a block diagram of an exemplary embodiment of Raster Operations Unit 165 of FIG. 1 in accordance with one or more aspects of the present invention. Raster Operations Unit 165 receives fragment data and configuration information from Fragment Shader 155. The configuration information may include commands specifying an actual stencil function, referred to as a stencil function. The stencil function specifies a comparison function, a comparison mask, and a reference value to be applied during conventional stencil testing performed in Raster Operations Unit 165. Typical comparison functions include greater than, less than, equal, not equal, always, never, and the like. Stencil testing, as understood by those skilled in the art, is the application of the comparison function to a stencil value and the reference value, where the comparison mask is applied to both the stencil value and the reference value prior to the application of the comparison function. An output of the stencil test is a stencil test result, e.g., pass or fail. A stencil operation, specified by a command, controls updating of the stencil value based on the stencil test result and an output (pass or fail) of the depth test. Therefore, when stencil testing is applied to a fragment, the fragment may be rejected and the stencil value stored in the stencil buffer for the pixel position associated with the fragment may also be modified.

The configuration information also includes a predicted stencil function referred to as a stencil criterion that may be determined by a software driver executed by Host Processor 114. In an alternate embodiment the stencil criterion is determined within Programmable Graphics Processor 105. The stencil criterion includes a predicted comparison function that is an estimate of the comparison function specified by the stencil function. The stencil criterion includes a predicted reference value that is an estimate of the reference value specified by the stencil function. Finally, the stencil criterion may also include a predicted comparison mask that is an estimate of the comparison mask specified by the stencil function. In an alternative embodiment, the stencil criterion specifies a range of values for which the function is true, e.g., [0,99] instead of x<100.

The stencil criterion is used by a Stencil Test Result Unit 200 within Raster Operations Unit 165 to produce stencil test results. In one embodiment a stencil test result indicates whether or not a stencil value would fail the stencil test specified by the stencil criterion. In another embodiment a stencil test result indicates whether or not two or more stencil values would fail the stencil test specified by the stencil criterion, effectively compressing stencil test results for two or more stencil values into a single stencil test result. A stencil test result is output by Raster Operations Unit 165 to Rasterizer 150 as at least a portion of the stencil data.

When stencil testing is enabled, Raster Operations Unit 165 reads a stencil value corresponding to a pixel position associated with fragment data received from Fragment Shader 155 and performs stencil testing in a manner known to those skilled in the art. Following stencil testing, Raster Operations Unit 165 optionally writes a modified stencil value to the stencil buffer dependent on the stencil operation, stencil test result, and depth test result.

Figure 2B:
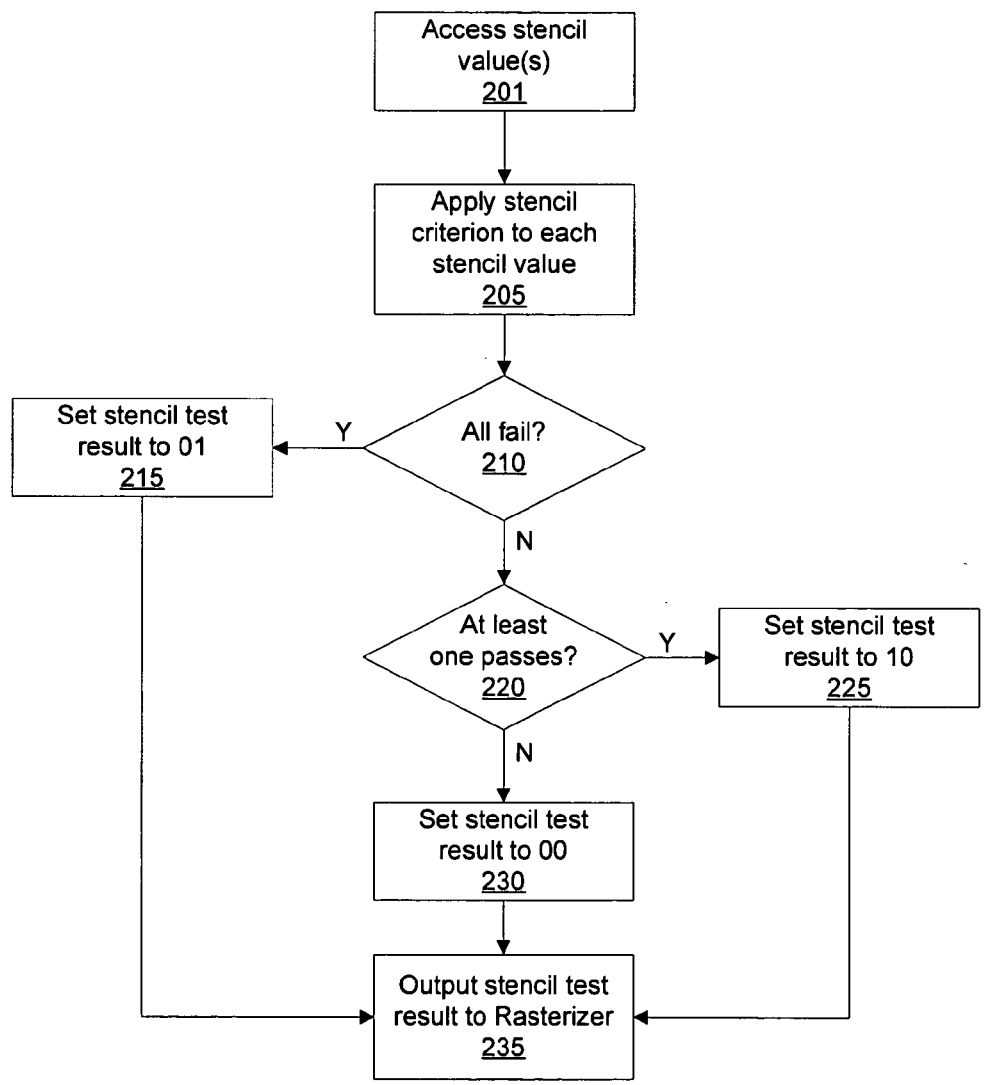
FIG. 2B illustrates an embodiment of a method of generating a compressed stencil result in accordance with one or more aspects of the present invention.

Whenever a stencil value is accessed, e.g. read or written, by Raster Operations Unit 165, Stencil Test Result Unit 200 generates a stencil test result for output to Rasterizer 150. FIG. 2B illustrates an embodiment of a method of generating a compressed stencil test result in accordance with one or more aspects of the present invention. In step 201 Raster Operations Unit 165 accesses one or more stencil values stored in a stencil buffer. In step 205 Stencil Test Result Unit 200 applies the stencil test specified by the stencil criterion to each stencil value accessed by Raster Operations Unit 165. In one embodiment the one or more stencil values form a 4×4 pixel aligned region, a 2×8 pixel aligned region, or an 8×2 pixel aligned region. In an alternate embodiment the one or more stencil values form a 2×2 pixel aligned region, a 2×4 pixel aligned region, or a 4×2 pixel aligned region. In step 210 Stencil Test Result Unit 200 determines if all of the one or more stencil values fail the stencil test specified by the stencil criterion, and, if so, in step 215 Stencil Test Result Unit 200 sets the stencil test result to a predetermined value. In one embodiment the predetermined value is a two bit value of 01. In some embodiments, when the one or more stencil values form a pixel aligned region including more than 16 pixels, Stencil Test Result Unit 200 sets a stencil test result for each 16 pixel region.

If, in step 210 Stencil Test Result Unit 200 determines all of the one or more stencil values do not fail the stencil test specified by the stencil criterion, then in step 220 Stencil Test Result Unit 200 determines if at least one of the one or more stencil values passes the stencil test specified by the stencil criterion. If, in step 220 at least one of the one or more stencil values passes the stencil test specified by the stencil criterion, then in step 225 Stencil Test Result Unit 200 sets the stencil test result to another predetermined value. In one embodiment the other predetermined value is a two bit value of 10. If, in step 220 Stencil Test Result Unit 200 determines at least one of the one or more stencil values does not pass the stencil test specified by the stencil criterion, then in step 230 Stencil Test Result Unit 200 sets the stencil test result to yet another predetermined value. In one embodiment the yet another predetermined value is a two bit value of 00 indicating that all of the one or more stencil values did not fail the stencil test and at least one of the one or more stencil values did not pass the stencil test. In other words, at least one of the stencil values in the pixel aligned region neither passes not fails the stencil test. In step 235 Stencil Test Result Unit 200 outputs the stencil test result to Rasterizer 150.

Stencil Test Result Unit 200 also outputs the pixel position data associated with the one or more stencil test values as a portion of the stencil data. For example, the pixel position data may include x,y coordinates corresponding to a lower left pixel of an n×m stencil tile and a mask indicating which positions within the stencil tile are included in the stencil test result. In some embodiments the n×m stencil tiles may be 2×2, 2×4, 4×2, or 4×4.

Figure 3A:
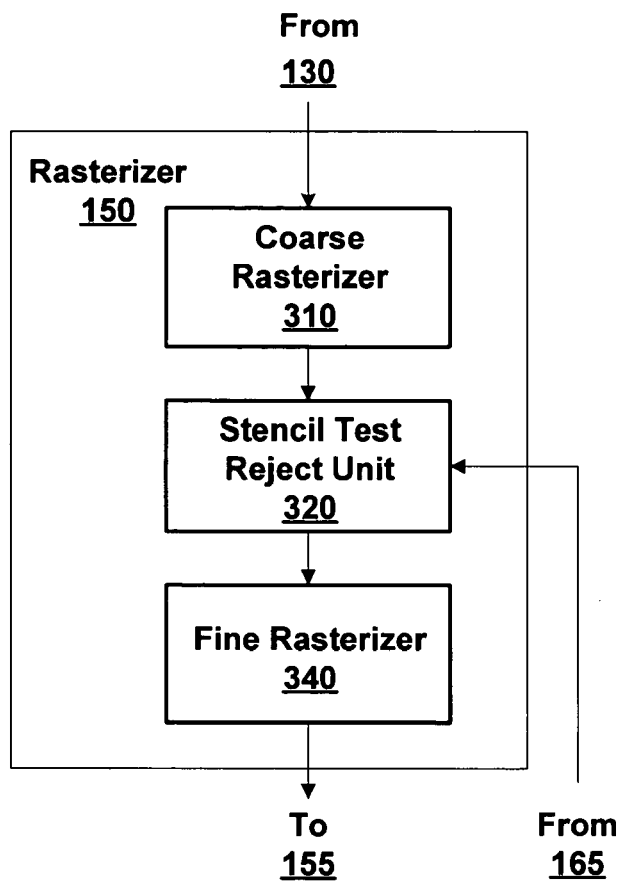
FIG. 3A is a block diagram of an exemplary embodiment of the rasterizer of FIG. 1 in accordance with one or more aspects of the present invention.

FIG. 3A is a block diagram of an exemplary embodiment of Rasterizer 150 in accordance with one or more aspects of the present invention. Rasterizer 150 receives graphics primitives and configuration information from Geometry Processor 130. A Coarse Rasterizer 310 within Rasterizer 150 processes the graphics primitives and produces sub-primitive tiles and sub-primitive coverage data which is output to a Stencil Test Reject Unit 320. Coarse Rasterizer 310 also outputs x,y coordinates associated with each sub-primitive tile to Stencil Test Reject Unit 320. In one embodiment a sub-primitive tile is 8 pixels wide and 8 pixels high.

Stencil Test Reject Unit 320 receives a sub-primitive tile and sub-primitive coverage data from Coarse Rasterizer 310 and stencil data from Raster Operations Unit 165. Stencil Test Reject Unit 320 processes the stencil data as described further herein, and uses the processed stencil data to optionally reject fragments within the sub-primitive tile, outputting modified sub-primitive coverage data to a Fine Rasterizer 340. In some embodiments, Stencil Test Reject Unit 320 also outputs a kill state bit. In other embodiments, the sub-primitive tile is culled, i.e. not output by Stencil Test Reject Unit 320 to Fine Rasterizer 340. Stencil Test Reject Unit 320 also outputs the x,y coordinates associated with the sub-primitive tile to Fine Rasterizer 340. Fine Rasterizer 340 receives the modified sub-primitive coverage data and x,y coordinates and produces fragment data and fragment coverage data that is output to Fragment Shader 155. In an alternate embodiment the functionality of Fine Rasterizer 340 is included within Coarse Rasterizer 310, and Stencil Test Reject Unit 320 is directly coupled to Fragment Shader 155.

Figure 3B:
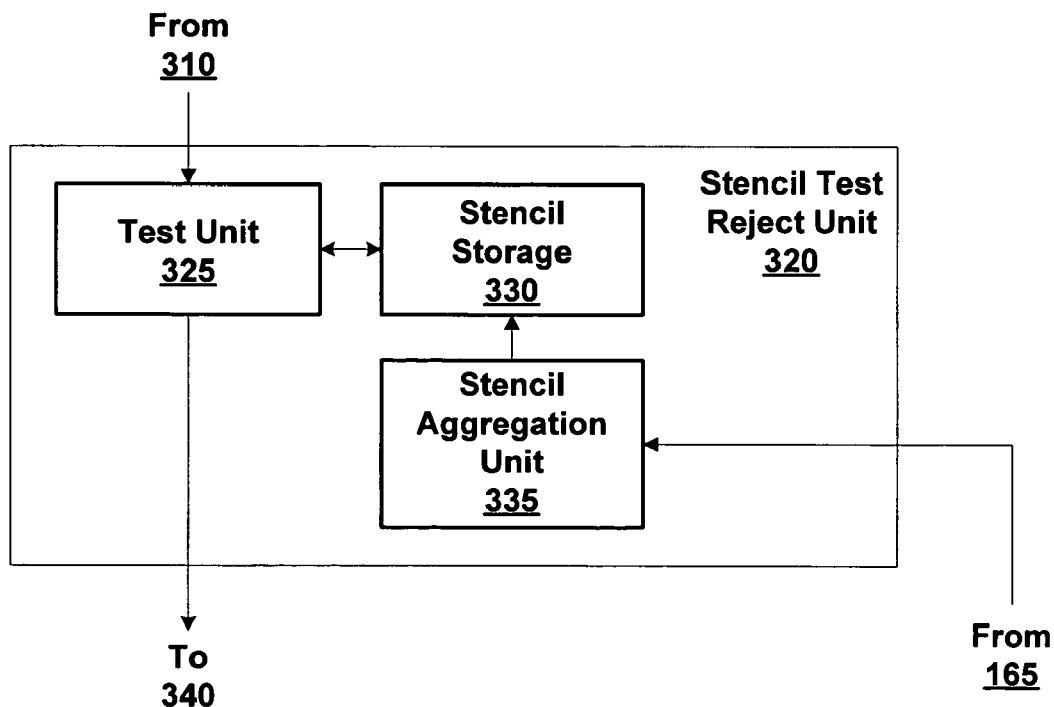
FIG. 3B is a block diagram of an exemplary embodiment of the stencil test reject unit of FIG. 3A in accordance with one or more aspects of the present invention.

FIG. 3B is a block diagram of an exemplary embodiment of Stencil Test Reject Unit 320 in accordance with one or more aspects of the present invention. Test Unit 325 receives sub-primitive coverage data from Coarse Rasterizer 310 and reads an aggregated stencil result from a storage resource, Stencil Storage 330. Stencil Storage 330 is initialized to store zeros or ones, indicating the aggregated stencil results fail the stencil criterion. In some embodiments, an aggregated stencil result is a stencil test result, where the stencil test result represents a stencil test result for at least one stencil value.

Test Unit 325 receives and stores stencil criterion from Coarse Rasterizer 310. Test Unit 325 also outputs the stencil criterion to Fine Rasterizer 340. A Stencil Aggregation Unit 335 receives stencil data from Raster Operations Unit 165, including a stencil test result and pixel position data. Stencil Aggregation Unit 335 combines the stencil data into an aggregated stencil result for a 4×4 stencil tile, as described further herein. In one embodiment the stencil tile is 8×8, 4×8, 8×4, or the like. The aggregated stencil result is stored in Stencil Storage 330.

Figure 3C:
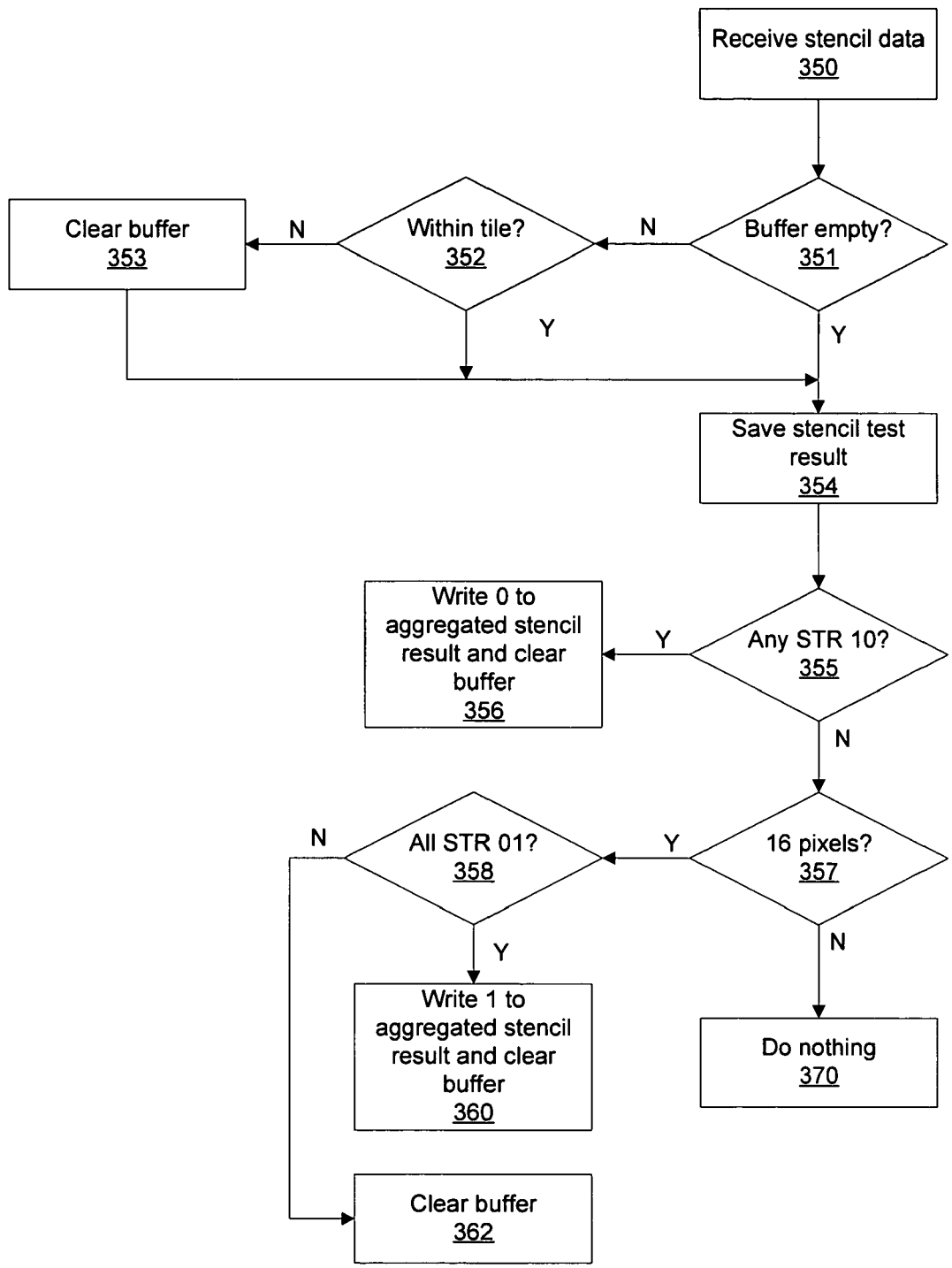
FIG. 3C illustrates an embodiment of a method of generating an aggregated stencil result in accordance with one or more aspects of the present invention.

FIG. 3C illustrates an embodiment of a method of generating an aggregated stencil result in accordance with one or more aspects of the present invention. In one embodiment Stencil Storage 330 stores an aggregated stencil result for a 4×4 stencil tile, so Stencil Aggregation Unit 335 attempts to combine the stencil data into a 4×4 stencil tile before writing the aggregated stencil in Stencil Storage 330. Stencil Aggregation Unit 335 stores stencil data received from Raster Operations Unit 165 in a storage resource (not shown), hereafter referred to as an aggregation buffer, within Stencil Aggregation Unit 335. In step 350 Stencil Aggregation Unit 335 receives stencil data, including a stencil test result, from Raster Operations Unit 165. In step 351 Stencil Aggregation Unit 335 determines if the aggregation buffer is empty, i.e. cleared, and, if so, proceeds to step 354. If in step 351 Stencil Aggregation Unit 335 determines the aggregation buffer is not empty, then in step 352 Stencil Aggregation Unit 335 determines if the stencil test result lies within the 4×4 stencil tile defined by the x,y coordinates associated with the stencil tile result(s) stored in the aggregation buffer. If the stencil test result is not within the 4×4 stencil tile, then in step 353 Stencil Aggregation Unit 335 clears the aggregation buffer. In step 353, Stencil Aggregation Unit 335 does not write Stencil Storage 330, thereby leaving Stencil Storage 330 unchanged, and proceeds to step 354. If, in step 352 Stencil Aggregation Unit 335 determines the stencil test result is within the 4×4 stencil tile, then Stencil Aggregation Unit 335 proceeds to step 354. In step 354 Stencil Aggregation Unit 335 stores the stencil test result received in step 350 in the aggregation buffer.

In one embodiment the stencil test result is stored for stencil data corresponding to each 2×1 region. In an alternate embodiment the stencil test result is stored for stencil data corresponding to each 1×1 region. Stencil Aggregation Unit 335 also stores the x,y coordinates (aligned to a 4×4 stencil tile boundary) included with the stencil data. In a further alternate embodiment, two stencil test result masks are stored in Stencil Storage 330. A pass mask indicates one or more passing stencil test results, each passing stencil test result corresponding to an n×m region. A fail mask indicates one or more failing stencil test results, each failing stencil test result corresponding to an n×m region. The pass mask and fail mask may be combined by Stencil Aggregation Unit 335 to produce a stencil test result.

In step 355 Stencil Aggregation Unit 335 determines if any stencil test result (STR) stored in the aggregation buffer has a 2 bit value of 10 (indicating at least one stencil value passed the stencil test specified by the stencil criterion), and, if so, in step 356 Stencil Aggregation Unit 335 writes an aggregated stencil result of 0 into a location in Stencil Storage 330 corresponding to the x,y coordinates for the stencil tile. In Step 356 Stencil Aggregation Unit 335 also clears the aggregation buffer.

If, in step 355 Stencil Aggregation Unit 335 determines a stencil test result does not have a 2 bit value of 10, then in step 357 Stencil Aggregation Unit 335 determines if the stencil test result(s) stored in the aggregation buffer complete a 4×4 stencil tile. If, in step 357 Stencil Aggregation Unit 335 determines the stencil test result(s) stored in the aggregation buffer complete a 4×4 stencil tile, then in step 358 Stencil Aggregation Until 335 determines if all of the stencil test results stored in the aggregation buffer have a 2 bit value of 01 (indicating all of the stencil values represented by the stencil test results fail the stencil test specified by the stencil criterion). If, in step 358 Stencil Aggregation Unit 335 determines all of the stencil test results stored in the aggregation buffer have a 2 bit value of 01, then in step 360 Stencil Aggregation Unit 335 writes an aggregated stencil result of 1 into a location in Stencil Storage 330 corresponding to the x,y coordinates for the stencil tile. In step 362 Stencil Aggregation Unit 335 also clears the aggregation buffer. If, in step 358 Stencil Aggregation Unit 335 determines all of the stencil test results stored in the aggregation buffer do not have a 2 bit value of 01, then in step 362 Stencil Aggregation Unit 335 clears the aggregation buffer. In step 362, Stencil Aggregation Unit 335 does not write Stencil Storage 330, thereby leaving Stencil Storage 330 unchanged.

If, in step 357 Stencil Aggregation Unit 335 determines the stencil test result(s) stored in the aggregation buffer does not complete a 4×4 stencil tile, then in step 370 Stencil Aggregation Until 335 does nothing. Specifically, Stencil Aggregation Unit 335 does not clear the aggregation buffer or write Stencil Storage 330.

Figure 4:
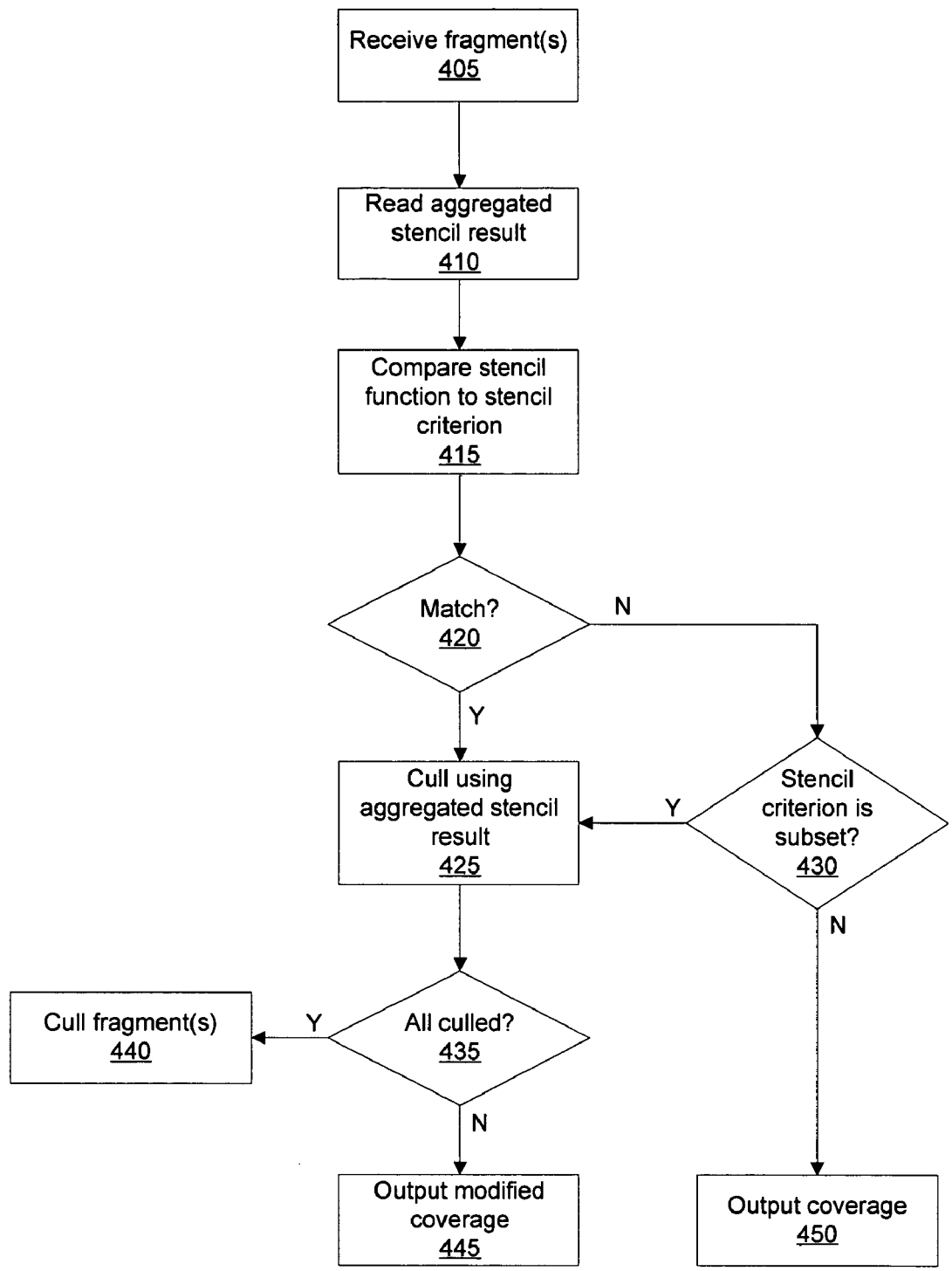
FIG. 4 illustrates an embodiment of a method of performing early stencil rejection in accordance with one or more aspects of the present invention.

FIG. 4 illustrates an embodiment of a method of performing early stencil rejection in accordance with one or more aspects of the present invention. In step 405 Stencil Test Reject Unit 320 receives one or more fragments and corresponding coverage data. In one embodiment Stencil Test Reject Unit 320 receives an 8×8 array of fragments and corresponding coverage data. In step 410 Test Unit 325 within Stencil Test Reject Unit 320 reads at least one aggregated stencil result from Stencil Storage 330. In one embodiment Test Unit 325 reads 4 aggregated stencil results, where each aggregated stencil result represents a compressed 4×4 array of stencil results.

In step 415 Test Unit 325 compares the stencil function to the stencil criterion. In one embodiment the stencil function is programmed using a stencil command. The stencil criterion includes a stencil function used by Stencil Test Result Unit 200 to produce the stencil results represented by the at least one aggregated stencil result read in step 410. In step 420 Test Unit 325 determines if the stencil function matches the stencil criterion, and, if so, Test Unit 325 proceeds to step 425. If, in step 420 Test Unit 325 determines the stencil function does not match the stencil criterion, then in step 430 Test Unit 325 determines if the stencil criterion is a subset of the stencil function.

For example, when the stencil criterion specifies a comparison function of "less than" and a reference value of 100, an aggregated stencil result for a 4×4 array indicating that all of the stencil values within the 4×4 array fail means that each stencil value within the 4×4 array is not less than 100. In other words, each stencil value within the 4×4 array is greater than or equal to 100. If the comparison function specified by the stencil function is "less than" and the reference value specified by the stencil function is 50, then the stencil function is a subset of the stencil criterion because a number less than 50 is also less than 100. In this example the aggregated stencil result indicates that each stencil value within the 4×4 array is greater than or equal to 100 and the aggregated stencil result also indicates that each stencil value within the 4×4 array is also greater than or equal to 50. Therefore, each stencil value within the 4×4 array fails both the stencil test specified by the stencil function and the stencil test specified by the stencil criterion.

If, in step 430 Test Unit 320 determines the stencil criterion is not a subset of the stencil function, then in step 450 Test Unit 320 outputs the coverage data. After the at least one fragment received in step 405 is shaded by Fragment Shader 155 it will be output to Raster Operations Unit 165 and the stencil function will be applied in a conventional manner known to those skilled in the art.

If, in step 430 Test Unit 320 determines the stencil criterion is a subset of the stencil function, then in step 425 Test Unit 320 culls portions of fragments using the at least one aggregated stencil result read in step 410. Specifically, Test Unit 320 negates bits within the coverage data corresponding to the x,y coordinates represented by the at least one aggregated stencil result, effectively rejecting a fragment associated with a negated bit within the coverage data.

In step 435 Test Unit 320 determines if all of the one or more fragments received in step 405 were culled, and, if so, in step 440 Test Unit 320 culls all of the one or more fragments. Therefore, the one or more fragments are not output by Stencil Test Reject Unit 320 to downstream blocks, such as Fine Rasterizer 340 and Fragment Shader 155 to avoid processing fragments which do not contribute to the final image. If, in step 435 Test Unit 320 determines all of the one or more fragments received in step 405 were not culled, then Test Unit 320 proceeds to step 445. In step 445 Test Unit 320 outputs the modified coverage data.

In addition to receiving fragments, Stencil Test Reject Unit 320 also receives commands, including commands which change the stencil function and stencil operations, and commands which change the stencil criterion, referred to as "stencil commands". Stencil commands include one or more commands that modify the comparison function, the comparison mask, or the reference value specified by either the stencil function or the stencil criterion. Other stencil commands include a command that clears a stencil buffer, a command that sets a stencil operation, and the like. Typical stencil operations, known to those skilled in the art include keep, zero, replace, increment, decrement, invert, and the like. The stencil operation controls updating of the stencil value based on the stencil test result and an output (pass or fail) of the depth test. Therefore, a stencil test result may change when a stencil value is changed during stencil testing or when a stencil command is executed by Raster Operations Unit 165. Specifically, a stencil value may change when the stencil operation permits modification of the stencil value, e.g., zero, replace, increment, decrement, invert. Updated stencil test results are communicated to Stencil Test Reject Unit 320 by Raster Operations Unit 165.

Rasterizer 150 stores stencil state information received via stencil commands in storage elements (not shown), such as registers, specifically storing the stencil function, stencil criterion, and stencil operations as stencil state information. When a command changing the stencil criterion is received by Rasterizer 150, the aggregated stencil values produced using the old stencil criterion will not be valid. Therefore Rasterizer 150 must initialize the Stencil Storage 330 again and wait until all previously processed fragments have been processed by Raster Operations Unit 165.

Furthermore, when the stencil operation included in the stencil function is an operation which modifies stencil values, i.e. stencil writes are enabled, Stencil Test Reject Unit 320 does not cull fragments using early stencil test rejection. When the stencil operation used by Rasterizer 150 changes to an operation which does not modify stencil values, i.e. disables stencil writes, Stencil Test Reject Unit 320 is able to cull fragments using early stencil test rejection. A synchronization mechanism, described further herein, is employed to assure that Stencil Test Reject Unit 320 does not begin culling fragments before the stencil command changing the operation used by Rasterizer 150 so that stencil writes are disabled is executed by Raster Operation Unit 165.

Figure 5:
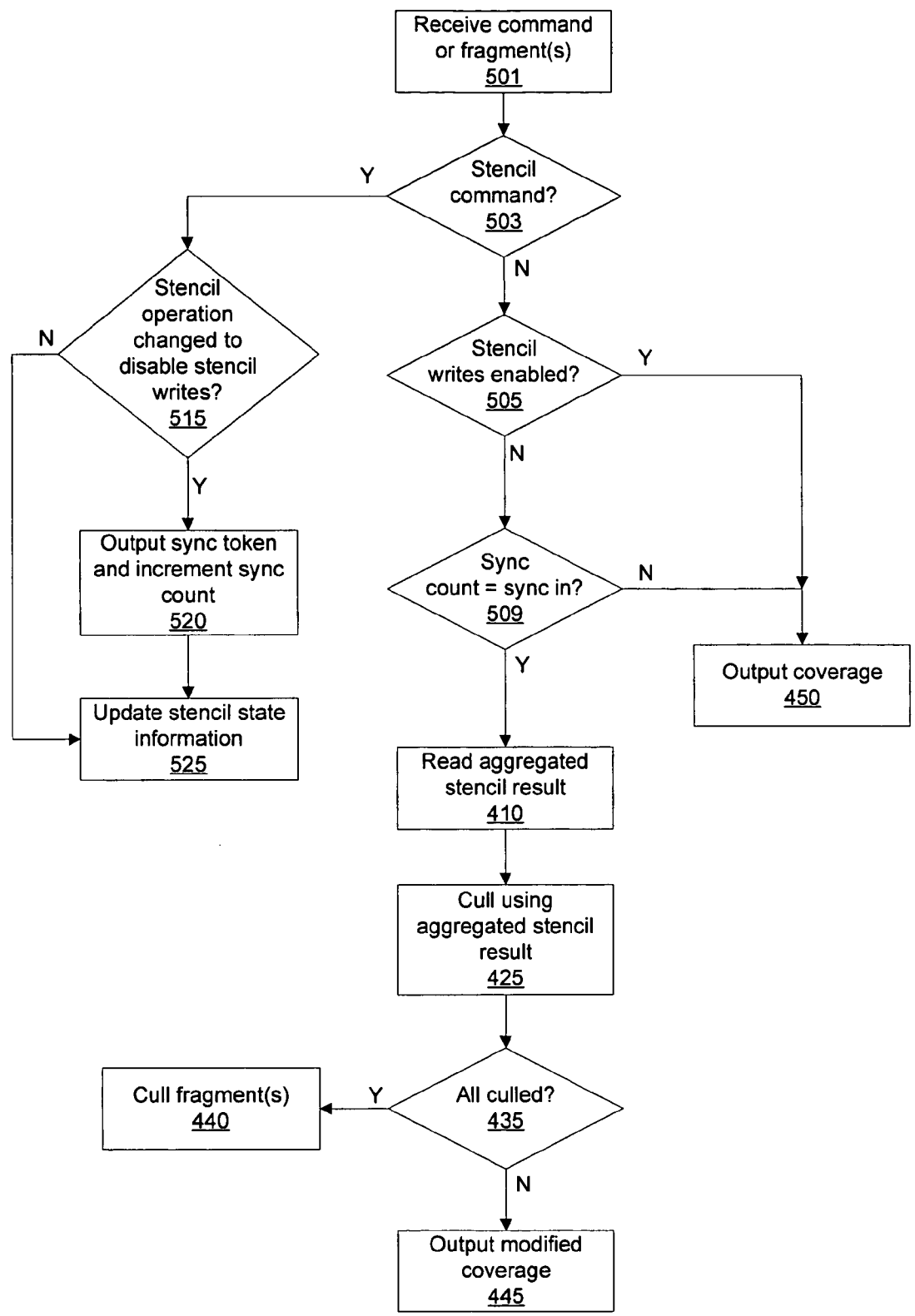
FIG. 5 illustrates an embodiment of a method of performing early stencil rejection in accordance with one or more aspects of the present invention.

FIG. 5 illustrates an embodiment of a method of performing early stencil rejection in accordance with one or more aspects of the present invention. FIG. 5 includes several steps described in relation to FIG. 4 and includes a synchronization mechanism. In step 501 Stencil Test Reject Unit 320 receives a command or at least one fragment. In step 503 Stencil Test Reject Unit 320 determines if a stencil command was received in step 501, and, if so, in step 515 Stencil Test Reject Unit 320 determines if the stencil command changes the stencil operations from operations which enable stencil writes to operations which disable stencil writes. If, in step 515 Stencil Test Reject Unit 320 determines the stencil command results in changing the stencil operations from ones which enable stencil writes to ones which disable stencil writes, then Stencil Test Reject Unit 320 proceeds to step 520. Otherwise, Stencil Test Reject Unit 320 proceeds to step 525 and updates the stencil state information.

In step 520 Stencil Test Reject Unit 320 outputs a synchronization (sync) token, including a sync count value. The sync count value is generated by a sync counter. In step 520 the sync counter is incremented to advance the sync count, producing another sync count value. The sync token is passed through Fine Rasterizer 340 and Fragment Shader 155 to Raster Operations Unit 165. When Raster Operations Unit 165 receives the sync token, the sync count value is extracted and output to Stencil Test Reject Unit 320, indicating that the stencil command was executed by Raster Operations Unit 165. Updated stencil test results, generated following execution of stencil commands received prior to the sync token, are also output from Raster Operations Unit 165 prior to the sync count value. After completing step 520 Stencil Test Reject Unit 320 proceeds to step 525 and updates the stencil state information.

If, in step 503 Stencil Test Reject Unit 320 determines a stencil command was not received in step 501, then in step 505 Stencil Test Reject Unit 320 determines if stencil writes are enabled by the stencil operation. If, in step 505 Stencil Test Reject Unit 320 determines that stencil writes are enabled, then in step 450 Stencil Test Reject Unit 320 outputs the coverage data received in step 501. If, in step 505 Stencil Test Reject Unit 320 determines that stencil writes are not enabled, then in step 509 Stencil Test Reject Unit 320 determines if the sync count value output by the sync counter is equal to the most recent sync count value received from Raster Operations Unit 165. If, in step 509 Stencil Test Reject Unit 320 determines the sync count value output by the sync counter is not equal to the most recent sync count value received from Raster Operations Unit 165, then Stencil Test Reject Unit 320 proceeds to step 450 and outputs the coverage data.

When the sync count value output by the sync counter is not equal to the most recent sync count value received from Raster Operations Unit 165, the aggregated stencil results stored in Stencil Storage 330 were not generated using the stencil state information and should not be used to perform early stencil rejection. Therefore the coverage data is output unmodified. Furthermore, when the stencil operation enables stencil values to be modified, Stencil Test Reject Unit 320 does not cull fragments, outputting coverage data unmodified.

If, in step 509 Stencil Test Reject Unit 320 determines the sync count value output by the sync counter is equal to the most recent sync count value received from Raster Operations Unit 165, then Stencil Test Reject Unit 320 proceeds to step 410.

In step 410 Test Unit 325 within Stencil Test Reject Unit 320 reads at least one aggregated stencil result from Stencil Storage 330. In step 425 Test Unit 320 culls portions of fragments using the at least one aggregated stencil result read in step 410. Specifically, Test Unit 320 negates bits within the coverage data corresponding to the x,y coordinates represented by the at least one aggregated stencil result, effectively rejecting a fragment associated with a negated bit within the coverage data.

In step 435 Test Unit 320 determines if all of the one or more fragments received in step 405 were culled, and, if so, in step 440 Test Unit 320 culls all of the one or more fragments. If, in step 435 Test Unit 320 determines all of the one or more fragments received in step 405 were not culled, then Test Unit 320 proceeds to step 445. In step 445 Test Unit 320 outputs the modified coverage data.

The invention has been described above with reference to specific embodiments. It will, however, be evident that various modifications and changes may be made thereto without departing from the broader spirit and scope of the invention as set forth in the appended claims. For example, in alternative embodiments, the early stencil rejection technique set forth herein may be implemented either partially or entirely in a software program, or a fragment program executed by Fragment Shader 155. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A method of performing early stencil rejection, comprising:
    comparing a first stencil function used to generate a stencil result to a second stencil function, wherein the first stencil function specifies a comparison function, a comparison mask, and a reference value; and
    modifying coverage data when the first stencil function matches the second stencil function to produce modified coverage data, wherein the coverage data indicates which pixels are covered by a fragment formed by an intersection of the pixels and a primitive.

2. The method of claim 1, further comprising shading a fragment associated with the modified coverage data.

3. The method of claim 1, wherein the stencil result includes compressed data representing stencil test results for at least two stencil values.

4. The method of claim 1, wherein the first stencil function is a predicted stencil function.

5. The method of claim 1, wherein modifying coverage data includes negating a portion of the coverage data when the stencil result indicates a stencil value corresponding to the portion of the coverage data failed a stencil test.

6. The method of claim 1, wherein modifying coverage data includes culling at least one fragment associated with the modified coverage data.

7. The method of claim 1, further comprising:
    determining whether the first stencil function matches the second stencil function;
    determining whether the second stencil function is a subset of the first stencil function if the first stencil function does not match the second stencil function; and
    modifying the coverage data if the second stencil function is a subset of the first stencil function.

8. The method of claim 1, further comprising:
    determining that stencil writes are disabled prior to modifying the coverage data.

9. The method of claim 1, further comprising:
    receiving a stencil command including a stencil operation which disables stencil writes that were previously enabled;
    outputting a sync token, the sync token including a copy of a sync count; and
    incrementing a counter used to generate the sync count.

10. The method of claim 9, further comprising:
    determining whether the sync count is equal to a received sync count prior to modifying the coverage data.

11. An early stencil rejection system, comprising:
    a storage resource configured to store stencil results that are produced using a stencil criterion that represents a predicted stencil function including a comparison function, a comparison mask, and a reference value; and
    a test unit coupled to the storage resource, the test unit configured to read a portion of the stencil results and to modify coverage data that indicates which pixels are covered by an unshaded fragment formed by an intersection of the pixels and a primitive, producing modified coverage data for the unshaded fragment.

12. The early stencil rejection system of claim 11, wherein the test unit is configured to compare the stencil criterion to a stencil function.

13. The early stencil rejection system of claim 11, further comprising an aggregation unit coupled to the storage resource, the aggregation unit configured to receive stencil data and produce the stencil results.

14. The early stencil rejection system of claim 13, further comprising a stencil test result unit coupled to the aggregation unit, the stencil test result unit configured to generate the stencil data by applying the stencil criterion to at least one stencil value.

15. The early stencil rejection system of claim 11, wherein a fragment shader is coupled to the test unit, the fragment shader configured to receive the modified coverage data and fragment data, producing shaded fragment data.

16. The early stencil rejection system of claim 11, further comprising a raster operations unit coupled to the stencil aggregation unit, the raster operations unit configured to provide stencil data to the stencil aggregation unit.

17. A method of performing early stencil rejection, comprising:
    producing stencil data using a predicted stencil function that specifies a predicted comparison function, a predicted comparison mask, and a predicted reference value; and modifying coverage data using the stencil data responsive to a comparison between the predicted stencil function and a stencil function, wherein the coverage data indicates which pixels are covered by a fragment formed by an intersection of the pixels and a primitive.

18. The method of claim 17, wherein the coverage data is modified when either the stencil function is a subset of the predicted stencil function or the stencil function is the same as the predicted stencil function.

19. The method of claim 17, further comprising:

updating the stencil data when a stencil value has changed.

20. The method of claim 17, further comprising:

updating the stencil data when the predicted stencil function has changed.

* * * * *

UNITED STATES PATENT AND TRADEMARK OFFICE
CERTIFICATE OF CORRECTION

| | | |
|---|---|---|
| PATENT NO. | : 7,184,040 B1 | Page 1 of 1 |
| APPLICATION NO. | : 10/719109 | |
| DATED | : February 27, 2007 | |
| INVENTOR(S) | : Svetoslav D. Tzvetkov | |

It is certified that error appears in the above-identified patent and that said Letters Patent is hereby corrected as shown below:

On the Title page, item 73, please replace "Nvidia Corporation" with --NVIDIA Corporation--

Signed and Sealed this

Nineteenth Day of June, 2007

JON W. DUDAS
*Director of the United States Patent and Trademark Office*